United States Patent [19]
Kneer et al.

[11] Patent Number: 5,447,678
[45] Date of Patent: Sep. 5, 1995

[54] METHOD FOR MAKING A CONTAINER WITH AN INNER DEFORMABLE BAG

[76] Inventors: Roland Kneer, Am Weide 11, 8105 Farchant; Christoph Heiland, Rottenbucher Straase 11, 8111 Saulgrub, both of Germany

[21] Appl. No.: 198,147

[22] Filed: Feb. 17, 1994

Related U.S. Application Data

[62] Division of Ser. No. 934,707, Aug. 24, 1992, Pat. No. 5,316,135.

[30] Foreign Application Priority Data

Sep. 18, 1991 [DE] Germany .................. 41 31 035.7
Nov. 30, 1991 [DE] Germany .................. 41 39 555.7

[51] Int. Cl.⁶ ............................................. B29C 49/22
[52] U.S. Cl. ................................. 264/515; 264/176.1
[58] Field of Search ............... 264/512, 513, 515, 171, 264/176.1

[56] References Cited

U.S. PATENT DOCUMENTS

| | | | |
|---|---|---|---|
| 2,777,612 | 1/1957 | Bensen | 222/109 |
| 4,657,151 | 4/1987 | Cabernoch | 215/11 G |
| 4,816,093 | 3/1989 | Robbins, III | 264/515 |
| 5,242,085 | 9/1993 | Richter et al. | 222/105 |
| 5,301,838 | 4/1994 | Schmidt et al. | 222/95 |

FOREIGN PATENT DOCUMENTS 182094 5/1986 European Pat. Off. ............ 264/515

*Primary Examiner*—Catherine Timm
*Attorney, Agent, or Firm*—Juettner Pyle Lloyd & Piontek

[57] ABSTRACT

The bottle-shaped container is made in a coextrusion blow molding process and has a dimensionally stable outer container and an easily deformable inner bag which consist of different thermoplastic materials that cannot be welded to each other. The preform has a diameter greater than that of the bottle neck so that, when the blow mold is closed, the blow mold halves squeeze off excess material not only on the bottom, but also in the shoulder and neck area. Unwelded seams of the outer container are thereby formed in the shoulder and neck area. In the bottom area the outer container is closed by a weld seam which has been formed by displacing material, the weld seam of the inner bag being fixed in said area. After negative pressure has been applied to the inner bag, holes are formed in the upper area of the outer container for the purpose of a permanent pressure compensation. All openings in the outer container are covered by the pump housing. The container operates reliably in the upside-down position.

4 Claims, 3 Drawing Sheets

METHOD FOR MAKING A CONTAINER WITH AN INNER DEFORMABLE BAG

This is a divisional of application Ser. No. 07/934,707, filed on Aug. 24, 1992, now U.S. Pat. No. 5,316,135.

BACKGROUND OF THE INVENTION

This invention relates to a container, in particular a bottle-shaped container, consisting of a substantially dimensionally stable outer container or inner bag which are made in a coextrusion blow molding process from different thermoplastic materials that do not combine with each other, the container having an upper shoulder section which preferably passes into a container neck to which a pump is attached for discharging the filling of the inner bag.

Such a container is e.g. used for the reception and dosed discharge of medicinal liquids. The negative pressure which is required for emptying the inner bag can be produced by manually operating the pump which is provided with a valve.

To enable the per se easily deformable inner bag to contract upon the application of a negative pressure for the dosed discharge of a liquid, it is necessary for a container of the type in question that air can flow into the space between the dimensionally stable outer container and the easily deformable inner bag, so that no negative pressure is created there by the reduced volume of the inner bag. Such a negative pressure would impair the further emptying operation and make such an operation impossible in the end.

To solve this problem, EP 0 182 094 discloses a bottle-shaped container whose outer container has an open seam at its bottom end while the inner container is tightly closed at this place by a weld seam. The open bottom seam of the outer container is formed at the bottom of the blow mold when excess material of the coextruded preform is squeezed off, which operation is always necessary, the wall portions of the inner bag being located in the squeeze area between the opposite wall portion of the material tube forming the outer container and thereby preventing the welding of the bottom seam of the outer container. After the blowing operation has been completed, a force is exerted on the bottom of the outer container when the blow mold is opened. This force opens the unwelded seam forever and to such an extent that air constantly enters through this opening at the bottom side at the pressure of the ambient atmosphere into the outer container, so that negative pressure cannot be produced in the already known container between the outer container and the inner bag.

This known container has several disadvantages. The elongated widened seam in the bottom of the outer container readily permits an engagement of the interior of the outer container, so that the soft inner bag might be damaged. As a result, the liquid received therein possibly flows out. Furthermore, foreign matter could penetrate into the interior between the outer container and the inner bag. A more serious problem is, however, that the open gap in the bottom of the container might create the impression that the container is damaged, which can give rise to complaints by buyers, especially when a container of this type is used in the pharmaceutical field.

Another disadvantage of the already known container is that a riser must engage the inner bag to ensure an emptying process which is as complete as possible because otherwise the inner bag is not held in the axial direction of the container and might collapse during partial emptying in such a way that the emptying operation cannot be continued. In the already known container the riser holds the inner bag in a stretched position, whereby the costs of the whole operable container are, however, not increased to a considerable extent. A great disadvantage of the riser is that the container can neither be used in a optimum way nor emptied entirely in the upside-down position.

U.S. Pat. No. 2,777,612 shows a toothpaste tube with an outer tubular container of a flexible or elastic material and a rubber-like inner container which is clamped in the bottom end of the outer container. A valve is disposed in the wall of the outer container for a pressure compensation in the interspace.

SUMMARY OF THE INVENTION

It is the object of the present invention to develop a container of the type in question in such a way that the above-mentioned disadvantages are eliminated. The container should preferably have the shape of a bottle and be ready to dispense a liquid in the upside-down position in a reliable way without the invention being, however, limited to the bottle shape and the liquid contents.

According to the invention the substantially dimensionally stable outer container is equipped on its bottom with a closed, at least partly welded seam which covers the weld seam of the inner container, whereby the bottom of the outer container is closed and the weld seam of the inner container is held or permanently clamped in the bottom area of the outer container which is closed in this way. Furthermore, on its shoulder section the outer container has at least one unwelded seam defined by opposite wall sections of the outer container which are not bonded or welded to each other whereas the inner bag is tightly closed in this area by weld seams so that air can here enter into the space between the outer container and the inner container. Two unwelded or unbonded seams are preferably provided over part of the two shoulder sections of the container.

The unwelded seams on the shoulder section of the outer container can be formed by giving the two-layered tubular preform, from which the container of the invention is blown, a diameter which is greater than that of the container opening or optionally greater than the neck of the container, so that, when the blow mold is closed, the tubular preform is squeezed off in the shoulder area for removing excess material. In the squeeze area of the shoulder section material of the inner bag is then positioned between the material of the outer container which is thereby spaced apart, so that said material cannot be welded or bonded to itself.

The closed, at least partly welded seam on the bottom of the outer container is formed by the special shape of the squeeze area of the blow mold at the bottom side. The excess material is here squeezed off the material of the outer container is displaced at both sides of the seam and untied to obtain an outwardly oriented web. These two operations of squeezing off and uniting material of the outer container at both sides can be carried out simultaneously when the mold is being closed, or they may be performed in separate successive steps by uniting the material of the outer container which is still in its plastic state in a separate step and after the blow molding of the container of the invention to form a closed weld seam covering the squeeze seam.

The bottom of the container of the invention is preferably made concave in such a way that the weld seam projecting from the offset bottom surface does not protrude beyond the annular outer region of the bottom, so that the stability of the container is not impaired by the either partly or fully welded seam which is at any rate closed.

The weld seam of the inner bag is clamped in the bottom section of the outer container in such a way that the inner bag is held in the axial direction of the bottle-shaped container. As a consequence, the arrangement of a riser becomes superfluous because the inner bag which is kept in a stretched state can be emptied entirely without the aid of said element, so that the costs of the inventive container are reduced. Of at least equal importance is the fact that the container of the invention also operates in the upside-down position in a perfect way and can be emptied entirely.

Foreign matter cannot penetrate into the closed bottom portion of the container, nor can sharp-pointed articles be introduced to damage the inner bag wantonly, which has been easily possible with the known container.

The closed bottom seam of the outer container which permits an axial mounting of the inner bag without a riser is also of great importance to the manufacturing method for the container of the invention if holes are to be formed in the walls of the outer container in the upper region thereof for the purpose of a permanent pressure compensation between inner bag and outer bag. This shall be described in more detail further below.

As already mentioned, the open seam or seams permit the passage of air in the area of the shoulder section of the outer container. If these unwelded seams are large enough, a permanent pressure compensation can be accomplished by said seams between inner bag and outer bag, so that no other measures are required.

This, however, is normally not the case because the unconnected opposite border edges of the outer container tend to rest on each other in the presence of a negative pressure in the area of the open seam. It is therefore suggested in an advantageous embodiment of the invention that at least one hold, preferably a plurality of holes, should be formed in the wall of the outer container for permitting a permanent pressure compensation. These holes should be provided in an especially advantageous way in the upper portion of the outer container, i.e. in the shoulder area or in the upper section of the preferably cylindrical outer wall of the outer container because these holes can be concealed according to the invention in the way described further below.

According to the invention the holes are made after the blowing operation in that a negative pressure is exerted on the inner bag so that the latter contracts. Since the inner bag is fixed to the bottom of the outer bag, it collapses radially upon exertion of said negative pressure and detaches over its entire length from the wall of the outer container. If the inner bag was not held on the bottom, it would lift from the bottom portion and contract upwards in the direction of the container neck, remaining in the upper cylindrical wall portion and in the area of the shoulder section in contact with the wall of the outer container. In this latter case it would be impossible to form holes in the upper region of the outer container because the inner bag would be damaged thereby.

By contrast, the inner bag becomes fully detached from the wall of the outer container in the manufacturing method of the invention as already stated (except for the lower fixing seam and preferably the neck portion).

The negative pressure can be exerted on the inner bag in that a mandrel is positively inserted (optionally with an annular seal) into the container neck and communicates with a vacuum pump via a suction line. Pressure compensation is preferably effected through the unwelded shoulder seams. The invention is, however, not limited thereto. Rather, the arrangement of the container neck between the outer container and the inner container.

The holes can be formed in the wall of the outer container by all suitable methods, e.g. by ultrasound or mechanically through perforation by means of needle-shaped pins.

The entry of air through the shoulder seams can be promoted during the step of forming the holes by compressing the container laterally in such a way that the opposite border edges of the outer container are additionally spaced apart from each other in the area of the shoulder seams. This should preferably be done in a state in which the outer container is no longer plastically deformable, so that the container assumes its original shape again.

In contrast to the bottom portion of the container, all openings in the wall of the outer container in the shoulder portion and the upper wall portion are to be concealed. To this end, this portion should be covered externally with the housing of the pump to be mounted on the container opening. For this purpose it is suggested that the housing of the normally used pumps should be extended such that it surrounds the whole shoulder portion and optionally part of the preferably cylindrical outer wall of the outer container. The openings are consequently not exposed to the outside, so that the space between the outer casing and the inner bag is not soiled and the intactness of the bag is ensured despite external action (if the outer housing is not damaged). Moreover, the wrong impression that the container is damaged can no longer be created.

The unwelded shoulder seams should preferably extend only over part of the shoulder section up to the container opening, which is the case whenever the diameter of the tubular preform is smaller than the diameter of the preferably cylindrical container wall. The remaining closed outer ring of the shoulder section increases the strength of the container.

As stated, the container of the invention is preferably shaped in the form of a bottle, the shoulder section passing into a container neck so that the unwelded seams of the shoulder portion are continued in the neck portion up to the opening thereof. In this context it is advantageously suggested that an outwardly oriented ring onto which the pump can be snapped with an associated circumferential wall should be molded onto the edge of the container neck on the opening thereof. The outwardly oriented snap-on rim of the container neck is sealed or welded during its formation by a mandrel, which is inserted into the blow mold, by displacing material of the outer container in the area of the squeeze seam so that the snap-on ring is firmly closed on all sides. The permits a tight connection of the pump which is mounted on the snap-on ring and engages the interior of the inner bag. In addition, the snap-on ring is radially acted upon inwardly by a circumferential wall of the pump which surrounds said ring and is snapped thereunto, so that the snap-on ring would even be retained if its welding was incomplete along the squeeze edge. The special design of the edge of the container neck ensures that the pump can be mounted on the container opening tightly and firmly so that a perfect operation is ensured.

The invention is, however, not limited to this embodiment, but a bolted connection may e.g. be provided on the container neck.

The inner surface of the neck should advantageously widen slightly upwards and conically, this conical seat of the pump contributing to the effect that the inner bag is retained in the neck portion. Moreover, material is mixed by sizing the neck portion, so that outer container and inner bag are held together in the neck portion.

PP is preferably suggested as the material of the outer container while the inner bag expediently consists of polyethylene. Of course, the invention is not limited to the use of these materials. Rather, other thermoplastic materials that do not combine with each other during coextrusion and the subsequent blowing operation are also suited.

The use of polypropylene with an additive, preferably a release agent which facilitates the release from the polyethylene layer, as is also suggested according to the invention, makes the recycling of the container easier.

When viewed in cross-section, the weld seam of the outer container in the squeeze area of the bottom has preferably a kite-like shape and is in alignment with the weld seam of the inner bag which is firmly clamped by the additional wall section of the outer container.

The container of the invention avoids the above-mentioned disadvantages of the known container without requiring any expensive means therefor. The openings in the shoulder portion and optionally holes in the shoulder portion or the upper portion of the wall of the outer container can be concealed by a pumping housing section covering said portion. This measure is comparably with the insertion of a riser, so that the manufacture of the container of the invention does virtually not lead to any additional costs. Furthermore, the container of the invention reliably discharges its contents in the upside-down position as well.

THE DRAWINGS

Other details of the invention become apparent from the following description taken in conjunction with the drawing, in which.

DESCRIPTION OF THE PREFERRED EMBODIMENTS

Figure 4C:
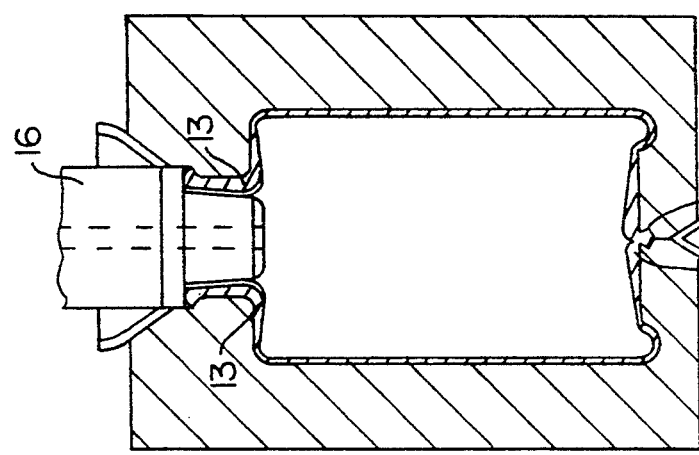
FIGS. 4a–4c illustrate successive steps in the making of the container by coextrusion blow molding.
Figure 4B:
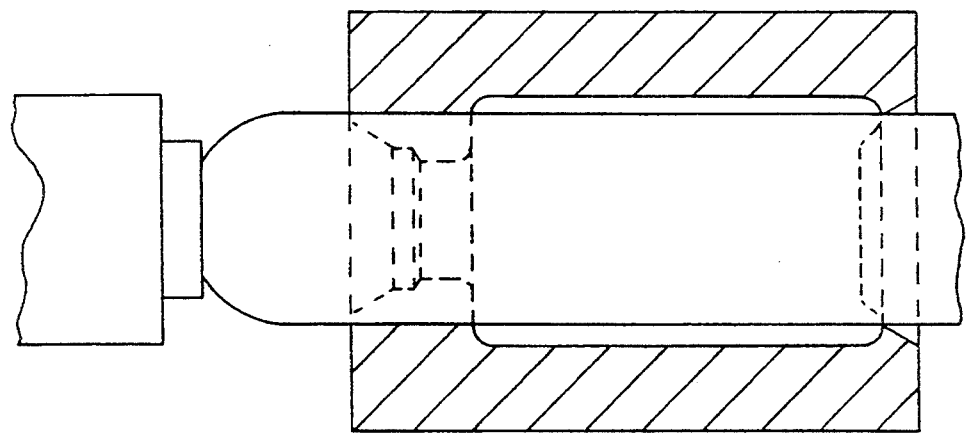
Figure 4A:
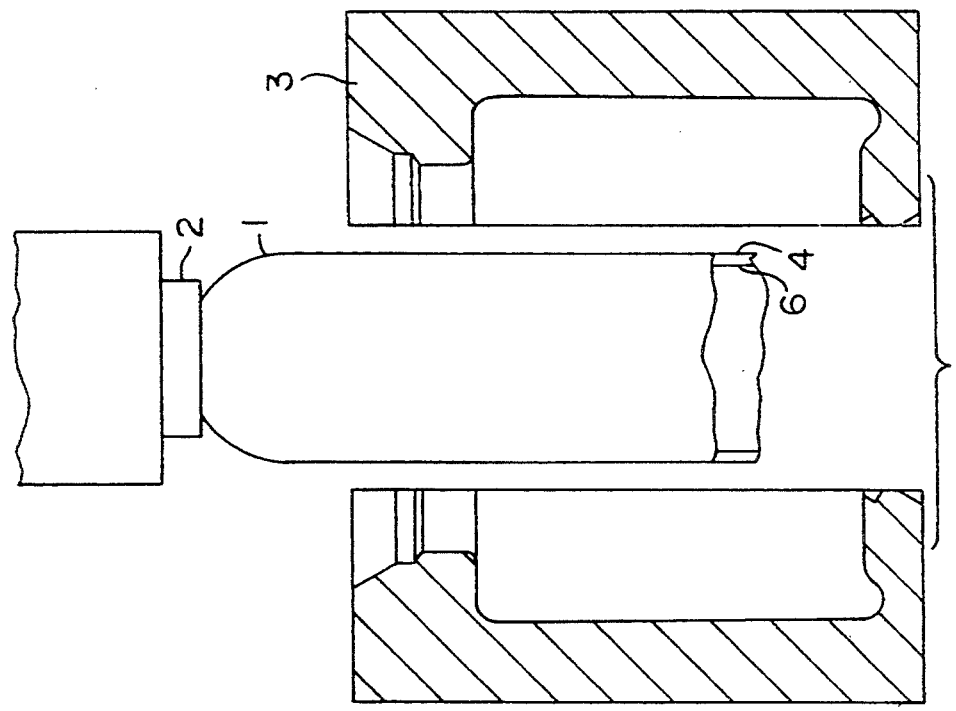

Reference is first of all made to FIGS. 4a–4c which show successive steps of making a bottle-shaped container according to the invention. A tubular preform 1 which consists of two concentric material layers exits from an extrusion head 2 and is arranged between the opened halves of a blow mold 3 which is closed when preform 1 has reached the length required for making a bottle-shaped container. Preform 1 consists of an outer material layer 4 for forming a dimensionally stable outer container 5 and of an inner material layer 6 which is blown up to form an easily deformable inner bag 7. The two material layers 4 and 5 consist of different thermoplastic materials which cannot be welded or bonded to each other.

As becomes apparent from the illustration of FIG. 4b, which is turned by 90° in comparison with FIGS. 4a and 4c, preform 1 has a diameter which is greater than the outer diameter of a neck 8 of the bottle-shaped container and which is smaller than the outer diameter of the cylindrical outer wall 9 of the container.

As a result, excess material is squeezed off in both the area of shoulders 10 and neck 8 and the bottom area when the two halves of the mold are closed.

While in the area of shoulder 10 and neck 8 the material of the inner layer 6 is positioned between the material of the outer layer 4 along the squeeze edge, which prevents the outer material layer 4 from being welded or bonded to itself, an outwardly projecting weld seam 11 is preferably formed in the bottom area due to the special shape of the blow mold. Said weld seam consists at least in part, i.e. in the range of a few tenths of a millimeter, of the outer material layer 4, whereby the outer container 5 is closed in the area of the squeeze edge at the bottom side. A complete weld seam 11, i.e. one which is closed over its total height, can also be formed by displacing material of the bottom layer which is still in its plastic state in a step following the blow molding step.

By contrast, the inner bag 7 is welded in both squeeze areas, i.e. at the bottom and in the shoulder and neck area because, when the mold halves are closed, the material of the inner layer 6 is pressed against itself without another material being inserted, so that tight weld seams 12 and 13 are formed in the squeeze areas.

The unwelded seams 14 which have been formed in the shoulder and neck area of the outer container 5 permit the entry of air into space 15 which is provided between the dimensionally stable outer container 5 and the flexible inner bag 17.

Figure 2:
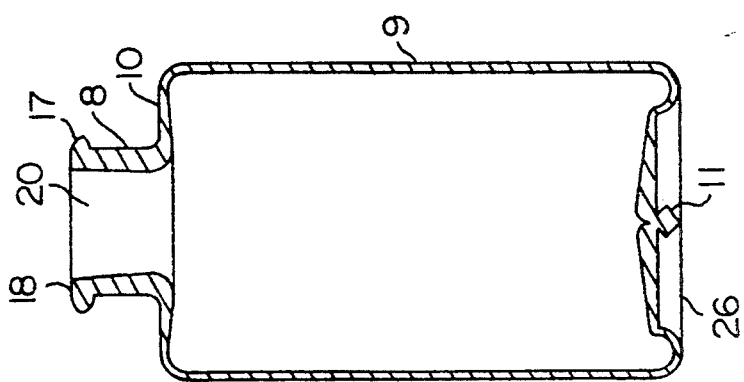
FIG. 2 is a longitudinal section through the container of FIG. 1.
Figure 1:
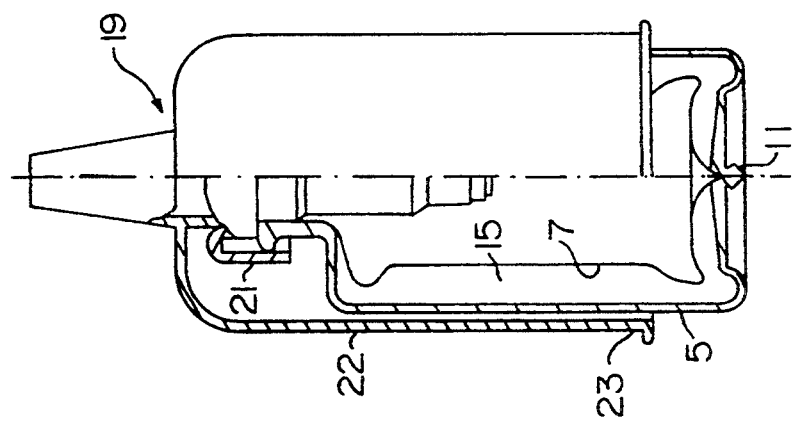
FIG. 1 is a partial sectional side view of a container of the invention with an installed pump and an inner bag which is already emptied in part.
Figure 7:
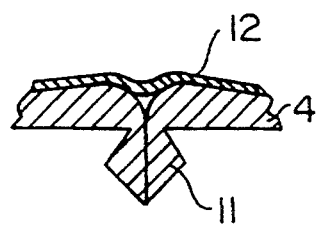
FIG. 7 is a cross-section through the area of the bottom weld seams of the inner bag and the outer bag.

As becomes especially apparent from FIGS. 2 and 7, the weld seam 12 of the inner bag 7 at the bottom side is fixed in the bag of the outer container 5, so that the inner bag 7 is held in axial direction when being emptied, as outlined in FIG. 1.

After the two halves of blow mold 3 have been closed, a sizing mandrel 16 is introduced into the mold cavity to finish neck 8 of the container with an outwardly oriented snap-on ring 17 and to squeeze off excess material, the preform being additionally blown up to obtain the finished container. The sizing operation effects a certain mixing of the material of the outer layer 4 and of the material of the inner layer 6, so that the inner bag 7 is held in the neck area on the outer container 5. This is also supported by an outwardly oriented small thickened rim portion 18 on the upper edge of the inner bag 7. This thickened portion rests inwardly on the snap-on ring 17. In the area of the squeeze seams the snap-on ring 17 is sealed or welded through the deformation caused by the sizing mandrel 16 because outer layer material comes into contact with itself in these areas due to the material movement.

As shown in FIG. 1, a pump 19 engages the container opening 20 and grips the snap-on ring 17 from behind with an annular attachment on a cylindrical wall 21. As a result, the snap-on ring 17 is firmly held together even if it is only incompletely sealed or welded in the area of the squeeze seams. Furthermore, pump 19 includes a cylindrical outer wall 22 which entirely covers the openings of the outer container 5 and extends almost down to the bottom area of the container. An outwardly oriented holding section 23 is molded onto the lower end of the circumferential wall 22 for operating pump 19.

Figure 5:
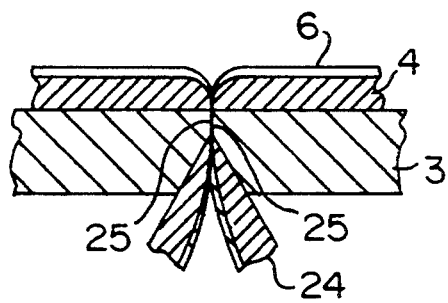
FIG. 5 is a cross-section through the squeeze area in the shoulder portion.

FIG. 5 is an enlarged view of a squeeze seam in the area of shoulder 10 and neck 8 of the container. Excess material 24 is squeezed off by squeeze edges 25 of the two mold halves 3, a tight weld seam of the inner bag 7 forming within mold 3 because the material layer 6 thereof rests on itself whereas material layer 4 is spaced apart by the interposed weld seam of material layer 6 and is not welded to itself. This creates an air entry opening 14 in the outer container 5.

FIG. 7 is an enlarged view of the bottom weld seam 11 of the outer container 5 which can be formed due to the special shape of the blow molding halves. When viewed in cross-section, weld seam 11 is an approximately kite-shaped lower extension of material layer 4, whereby a thickened portion if formed in which the interior weld seam 12 of the inner layer 6 is firmly embedded or clamped. In the bottom weld seam 11 material of the outer layer which is united from both sides of the seam rests on itself at least over part of the seam height, resulting in an adequate welding for closing the bottom and for holding the inner bag in axial direction. As for a preferred embodiment of the weld seam 11, reference is made to the dimensions shown in FIG. 7.

Figure 6:
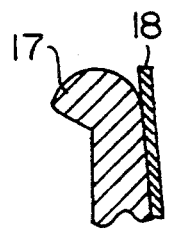
FIG. 6 is a cross-section through the area of the snap-on ring.

FIG. 6 is an enlarged view of details of the shape of snap-on ring 17 on the upper edge of the slightly conically broadening neck 8 of the container of the invention.

Figure 3:
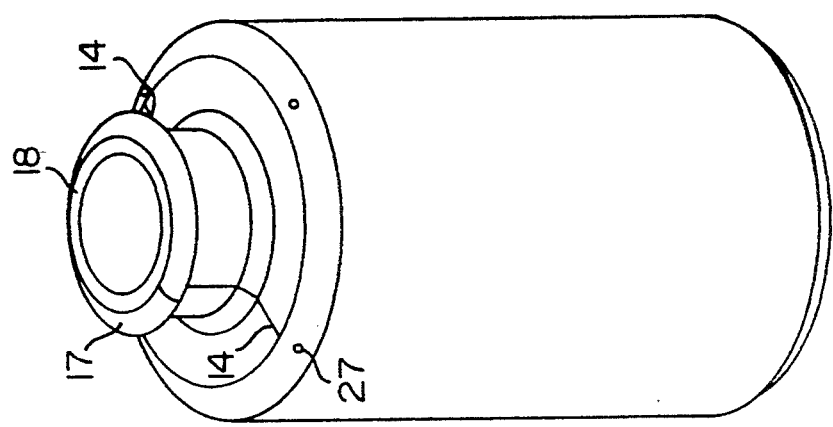
FIG. 3 is a perspective view of the container.

FIG. 3 shows holes 27 in .the radially outer annular portion of the shoulder section of the outer container 5.

With respect to FIGS. 1 and 2 it should be noted that the central bottom portion of the container is concavely set back inwards to such an extent that the projecting bottom weld seam 11 terminates in the plane 26 of the stand surface of the container, so that the stability of the container is not impaired.

We claim:

1. A method of making a container comprising the steps of coextruding a tubular preform comprising a first dimensionally stable outer portion and a second inner deformable portion having free ends, said first and second portions being composed of incompatible thermoplastic materials, molding an end of the preform into a receptacle bottom, wherein said molding step includes the formation of a weld seam in the first outer portion, and wherein the weld seam clamps the free end of the second inner deformable portion to close the end of the second portion to form an inner bag, and molding an upper part of the preform into a container shoulder, and then subsequent to the molding step, applying negative pressure to the inner bag to partially collapse the same and to form openings between unwelded seams in the shoulder.

2. The method of claim 1 wherein a neck is molded in the container in the molding step.

3. The method of claim 1 wherein said weld seam is molded in the form of a web projecting from the bottom.

4. The method of claim 3 wherein said web is substantially kite-shaped.

* * * * *